United States Patent [19]

Matsuhira et al.

[11] Patent Number: 5,893,624
[45] Date of Patent: Apr. 13, 1999

[54] LIQUID CRYSTAL DISPLAY DEVICE

[75] Inventors: Tsutomu Matsuhira; Satoshi Arai, both of Chiba, Japan

[73] Assignee: Seiko Instruments Inc., Japan, JPX

[21] Appl. No.: 08/889,230

[22] Filed: Jul. 8, 1997

[51] Int. Cl.$^6$ .................................................. G02F 1/1345
[52] U.S. Cl. .................................. 349/152; 349/151
[58] Field of Search .............................. 349/143, 145, 349/149, 150, 151, 152; 345/206; 361/749, 760, 764, 772, 775

[56] References Cited

U.S. PATENT DOCUMENTS

| | | | |
|---|---|---|---|
| 4,586,789 | 5/1986 | Kishimoto et al. | 349/152 |
| 5,680,191 | 10/1997 | Voisun et al. | 349/150 |
| 5,689,352 | 11/1997 | Kishigami et al. | 349/149 |
| 5,734,458 | 3/1998 | Ikubo et al. | 349/152 |
| 5,742,074 | 4/1998 | Takizawa et al. | 349/151 |
| 5,777,702 | 7/1998 | Wakagi et al. | 349/152 |

*Primary Examiner*—William L. Sikes
*Assistant Examiner*—Tai V. Duong
*Attorney, Agent, or Firm*—Adams & Wilks

[57] ABSTRACT

Drawn configurations of transparent electrodes from connection terminals to pixels in a liquid crystal display device are made different from each other according to the positional relationship between the pixels and the connection terminals, so that the resistance value of a drawn portion and the difference in resistance values between adjoining pixels are made low. This structure improves not only the picture quality of a liquid crystal display device with a wide pitch screen in which a multi-output terminal IC is connected by using fine electrodes, but also the patterning yield.

5 Claims, 7 Drawing Sheets

LIQUID CRYSTAL DISPLAY DEVICE

BACKGROUND OF THE INVENTION

The present invention relates to a liquid crystal display device used for a laptop, a notebook personal computer, a portable equipment or the like.

In a conventional COG (Chip On Glass) mounting structure of a simple matrix liquid crystal display device, as shown in FIG. 7, a plurality of transparent electrodes for switching liquid crystals and formed on transparent substrates 1a and 1b are comprised of a pixel portion 2, a drawn portion 3, and a connection terminal portion for connecting a slim-shaped liquid crystal driving driver IC 4.

The drawn portion 3 is a portion where connection terminals for connecting the liquid crystal driver IC 4 are connected to pixels constituting a display screen. The configuration of the drawn portion is as follows depending on the positional relationship between the connection terminals and the pixels.

That is, one or two transparent electrodes at the center of the connection terminal portion have the drawn portion having such a configuration that the transparent electrodes are linearly connected from the connection terminal portion to the pixel portion without being bent, and a plurality of transparent electrodes at right and left sides of the center terminal have such a configuration that they are linearly drawn from the connection terminal portion, and are connected to the pixel portion after being bent once. Thus, the drawn portion is formed of the linearly drawn area and the bent and drawn area, and the plurality of transparent electrodes are formed in parallel with each other at the same pitch for the respective areas.

In a conventional design using a TCP (Tape Carrier Package), since the pitch of the TCP could be designed at a value close to a pixel pitch, the distance between a pixel and a connection terminal including a sealing area for bonding two transparent substrates and a non-display area was 4.5 mm.

However, in the case where the connection terminals formed at the connection terminal portion have a pitch of not larger than 80 microns, the number thereof is not less than 160, and a pixel pitch of a liquid crystal display device is not less than 240 microns, if the distance between the pixel and the connection terminal is not made more than 4.5 mm, the width of the transparent electrode in the drawn portion becomes thinner than a connection pitch of the liquid crystal driver IC. However, increasing the size of the drawn portion does not meet the market needs. Further, as the output terminal number of one IC increases from 160 terminals to 240 terminals, the width of the transparent electrodes in the drawn portion becomes thin. Thus, patterning inferiority of the transparent electrode such as disconnection is increased so that the yield is lowered. Also, the picture quality of a liquid crystal display device is affected by the dielectric constant of the liquid crystal, frame frequency, display area per line, output resistance value of the liquid crystal driver IC, resistance value of the transparent electrode, and connection resistance value when both are connected to each other, so that there arises such a problem as shadowing (picture trailing) or contrast deteriorated.

Since the transparent electrode is made of a material of an oxide of IN and Sn, the resistance value thereof is high, the sheet resistance value is 10 $\Omega/\square$ at a mass production level, and lowering of the resistance of the transparent electrode is limited. Thus, the resistance value of the transparent electrode in the drawn portion from the connection terminal portion for the liquid crystal driver IC to the pixel portion, becomes high. Especially in the liquid crystal display device having a COG mounted slim-shaped liquid crystal driver IC, the transparent electrode drawn from electrode at the end of the liquid crystal driver IC becomes long, so that the screen becomes inferior in contrast. If an auxiliary electrode is formed of a metal film by plating, sputtering or the like in order to lower the resistance value of the transparent electrode, the cost is increased so that the method does not satisfy the request from the standpoint of the market price and has no merit. Even if an auxiliary electrode is formed by a method such as electroless plating on an exposed transparent electrode after fabrication of a liquid crystal cell, since the transparent electrode on which the auxiliary electrode is formed must be exposed, the width of the drawn portion must be made large, which eventually results in the increase of a frame portion of a liquid crystal panel.

SUMMARY OF THE INVENTION

In view of the above, an object of the present invention is therefore to provide a liquid crystal display device in which the drawn configuration of conventional transparent electrodes is changed so that the size of a drawn portion is not enlarged, patterning yield is improved, and display inferiority is not caused.

In order to solve the problem, in a liquid crystal display device having such a structure that two substrates with surfaces on which a plurality of transparent electrodes are formed, are provided, electrode surfaces in a matrix are opposite to one another, a liquid crystal is held between them, and that pixels are formed on the opposite electrode surfaces in the matrix, the transparent electrodes on at least one of the substrates include a connection terminal portion for connecting a circuit element, a pixel portion composed of matrix-shaped pixels, and a drawn portion for connecting the connection terminal portion to the pixel portion, and the configuration of the drawn portion includes at least three kinds of drawn configuration: a linear-shaped first drawn configuration which connects at least one connection terminal (referred to as a center connection terminal) at the center of the connection terminal portion to the pixel portion; a second drawn configuration for connecting a plurality of connection terminals (referred to as near center connection terminals) at right and left sides of the center connection terminal to the pixel portion, the second drawn configuration being such that the electrodes are linearly drawn in parallel with the first drawn configuration, are bent once in parallel with each other, and are drawn to the pixel portion; and a third drawn configuration for connecting a plurality of connection terminals (outer connection terminals) at both sides of the near center connection terminals to the pixel portion, the third drawn configuration being such that the electrodes are linearly drawn in parallel with the first drawn configuration, are bent in parallel with the second drawn configuration, are further bent at an almost right angle to the first drawn configuration toward the outside from the center connection terminal to be drawn, and are finally bent at an almost right angle to be drawn to the pixel portion.

According to this structure, although the drawn distance of the third drawn configuration becomes long, the width of the pattern can be made thick, so that the resistance value becomes low. Also, since the line pitch in the drawn configuration can be made larger than a conventional one, the inferiority of disconnection is decreased. Especially, this drawn configuration is effective for the case where the number of the connection terminals is 160 or more.

Here, providing that the distance between the connection terminal for connecting an IC and the pixel is "a", a pixel pitch is "b", the half of the number of the output terminals of the liquid crystal driver IC is "c", a terminal pitch of the IC is "d", a pitch of the second drawn pattern is "e", a pattern gap of the drawn portion is "f", a sheet resistance of the transparent electrode is "g", the drawn configuration is symmetrical with respect to the center terminal of the IC, the center connection terminal from which the electrode is linearly drawn to the pixel is designated by No. 0, the outermost terminal of the second drawn configuration is designated by No. h, the resistance value of the transparent electrode at the terminal No. h in the drawn portion is R1, and the resistance value of the transparent electrode at the outermost terminal in the third drawn configuration starting from terminal No. h+1 is R2, if "h" satisfying the following three equations is selected, then the resistance values of the transparent electrodes in the drawn portion after the terminal No. h can be made almost equal to each other.

$$R1 = R2 \tag{1}$$

$$R1 = \{a/(d-f)\} \times g \times \{(c-h)/c\} + \sqrt{\{(b-d)^2 h^2 + (a \times h/c)^2 56 \times g/(e-f)} \tag{2}$$

$$R2 = \{((b-d) \times c)/(a/(c-h)-f) + a/(b-f)\} \times g \tag{3}$$

Further, in the third drawn configuration, by drawing a part of the electrode in the direction opposite to a direction from the connection terminal to the pixel, a pitch of a portion drawn at an almost right angle to the first drawn configuration can be made large, so that the width of the pattern becomes wide and the resistance value can be further decreased.

Although the drawn resistance value from the connection portion of the IC to the pixel becomes the lowest when "h" satisfies the above mentioned equations, even if "h" does not satisfy the above mentioned equations, there is a range in which display irregularity does not occur. In the case where the number of the terminal from which the third drawn configuration starts is smaller than the number satisfying the above mentioned equations, the resistance value of the outermost wiring line among wiring lines in the third drawn configuration becomes large, so that the difference from the wire resistance value in the first drawn configuration becomes large.

On the other hand, in the case where the third drawn configuration starts from the terminal with the number larger than the number satisfying the above mentioned equations, the difference between the resistance value of the outermost wiring line in the second drawn configuration and the wire resistance value of the first drawn configuration becomes large. Although it depends on the specification of a screen, if the value of the difference is made 2–3 k Ω, preferably within 1 k Ω, superior picture quality can be obtained. Further, by thinning the wiring line in the first drawn configuration, the difference can be made small.

In the thus structured liquid crystal display device, since the resistance value of the transparent electrode in the drawn portion becomes low, the inferior picture quality including contract irregularity or the like generated by the conventional drawn configuration can be improved.

Further, since fine patterning areas in the drawn portion become small, disconnection inferiority due to patterning can be decreased.

DETAILED DESCRIPTION OF THE PREFERRED EMBODIMENTS

[Embodiment 1]

Preferred embodiments of the present invention will now be described with reference to the drawings.

Figure 1:
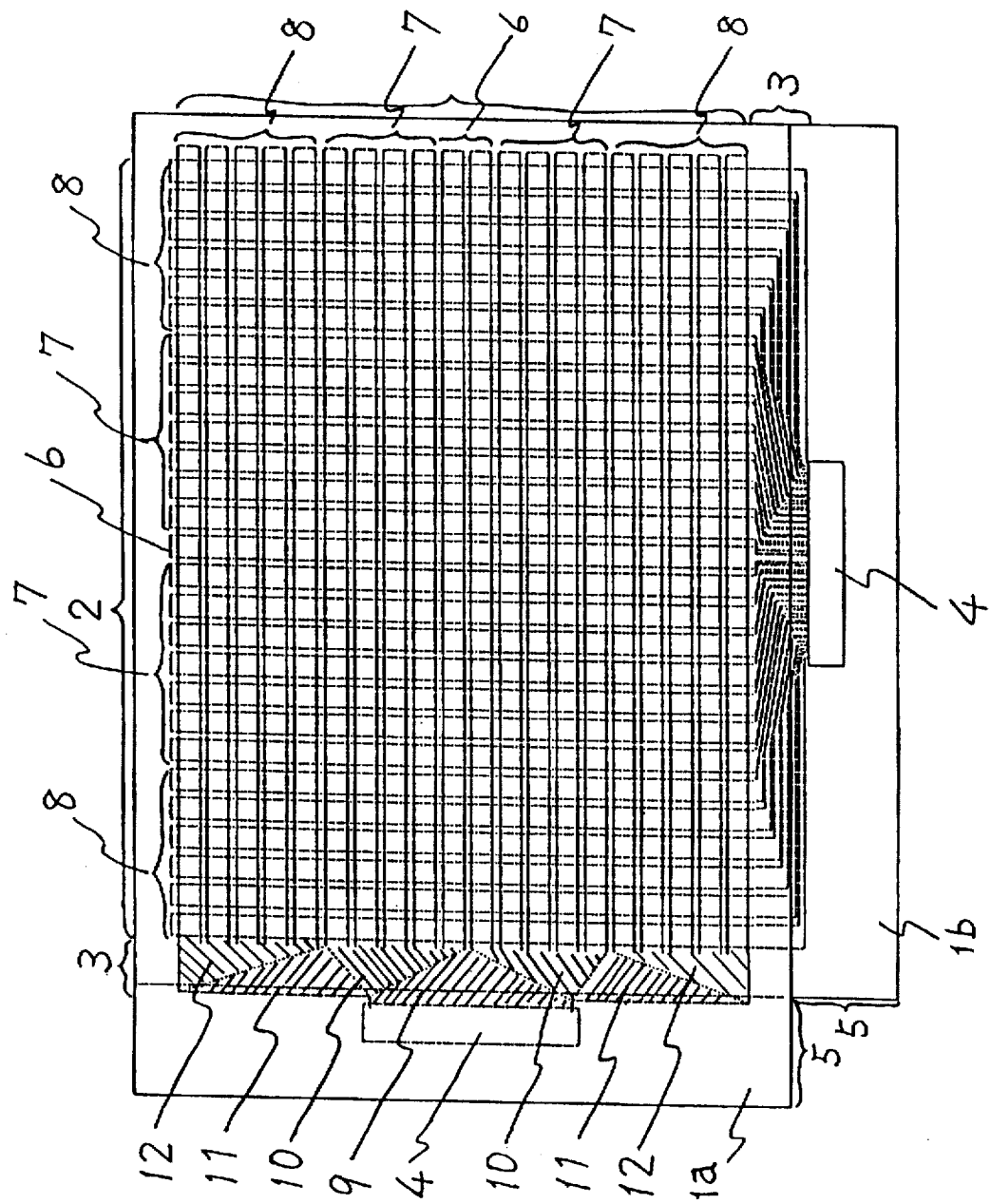
FIG. 1 is a front view showing a liquid crystal display device according to the present invention.

FIG. 1 is a front view showing a first embodiment of the present invention. A screen 2 is formed of portions where patterns formed of ITO on the respective surfaces of glass transparent substrates 1a and 1b are overlapped with each other in matrix, and liquid crystal drivers IC 4 for supplying signals to the respective patterns are respectively connected to connection terminals formed at a connection terminal portion 5 of each of the transparent substrates. Wiring lines are drawn from the connection terminals to pixels for each electrode through a drawn portion 3. A center electrode 6 to which the liquid crystal driver IC is connected, is linearly drawn in the drawn portion 3. This is the first drawn configuration. A plurality of electrodes 7 at both sides of the center electrode 6 are linearly drawn in the drawn portion 3 from the connection terminals, are once bent and are drawn to the pixel portion. This is the second drawn configuration. Further, a plurality of electrodes 8 at both sides of the electrodes 7 are, according to the third drawn configuration of the invention, once bent from the configuration linearly drawn from the connection terminals. The bent angle is the same as that of the second drawn configuration. Further, the electrodes are drawn outward at a right angle to the first drawn configuration, and are bent at a right angle toward the respective pixels and are drawn at the same pitch as the pixel electrodes.

Here, when the number of the connection terminals is 160, the pitch of the connection terminals is 80 microns, the pixel pitch is 240 microns, the width of the drawn portion is 4.5 mm, and the sheet resistance value of the ITO is 10 Ω, according to the above mentioned equations, 39 pieces of electrodes at right and left sides of the center terminal are made into the second drawn configuration, and the remaining 40 pieces at right and left side of terminals are drawn with the third drawn configuration.

Figure 2:
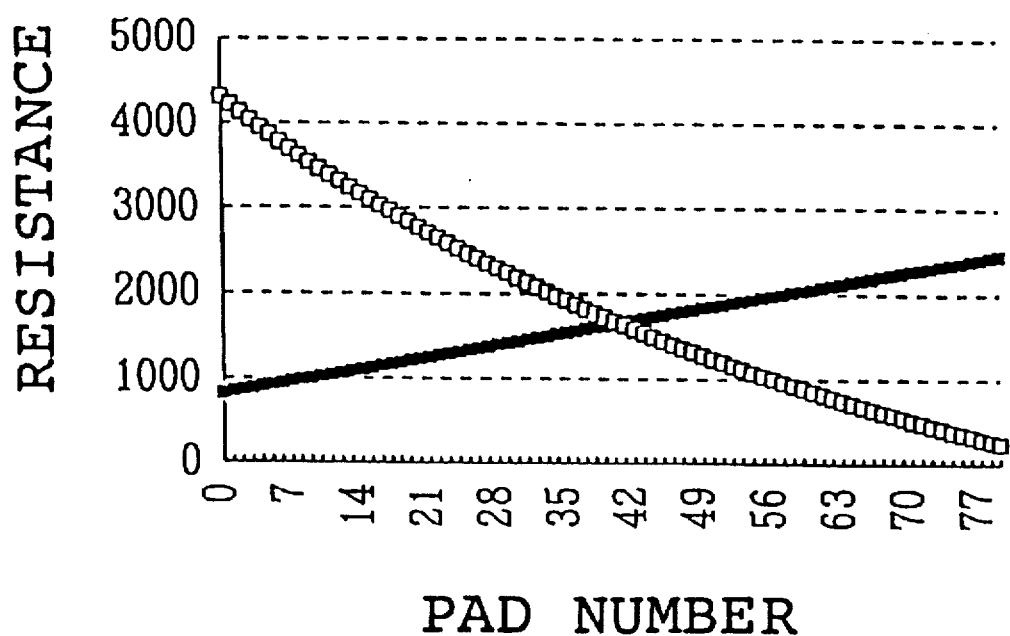
FIG. 2 is a graph showing drawn wire resistance values according to the present invention.

FIG. 2 relates to the half of the connection terminals, and is a graph in which ■ indicates the resistance values in the drawn configuration from the respective connection terminals to the pixels when the center connection terminal is designated by No. 0, and 79 pieces of terminals at the right half are drawn with the second drawn configuration, whereas □ indicates the resistance value of the 80-th electrode in the drawn portion when terminals are drawn with the third drawn configuration from the terminal number indicated in the drawing. If the electrodes are drawn with the third drawn configuration of the invention from the terminal number next to that at the intersection point of these two graphs, the resistance value in the drawn portion can be made minimum. In the case where the electrodes are drawn with the third drawn configuration from the terminal number smaller than the above noted terminal number, the resistance value of the 80-th electrode in the drawn portion becomes large. In the case where the electrode is drawn with the third drawn configuration from the terminal number larger than the above terminal number, the resistance value of the outermost electrode in the drawn portion drawn with the second drawn configuration becomes maximum. In this case where the electrodes the 80-th electrode are drawn with the second drawn configuration, the maximum resistance value in the drawn portion is 2320 Ω, whereas in the case where the electrodes after the 40-th electrode are drawn with the third drawing method of the present invention, the maximum resistance value in the drawn portion becomes 1670 Ω, so that 650 Ω which is about 30%, can be lowered. In order to uniform the drawn resistance values, the drawn wiring line having a low resistance value may be made thin by partially cutting away. The wiring pitches of the drawn portion will be described with reference to FIG. 1. They are divided into three kinds, that is, areas 9 and 10 of 80 micron pitch, area 11 of 110 micron pitch, and area 12 of 240 micron pitch. As compared with the conventional drawing method, the area of 80 micron pitch can be reduced by about 25%, so that the yield of patterning is improved.

[Embodiment 2]

Figure 3:
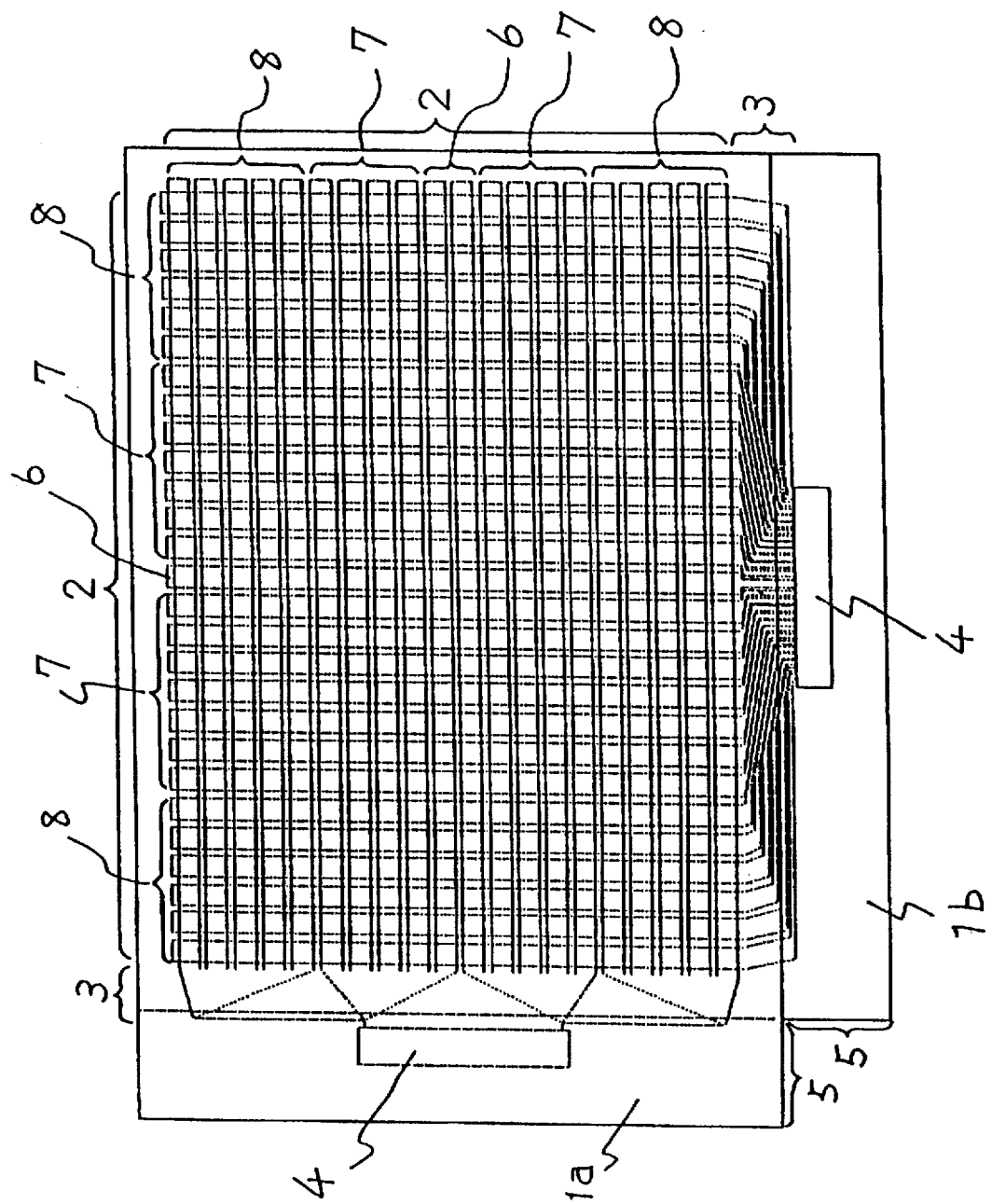
FIG. 3 is a front view showing a liquid crystal display device according to the present invention.

FIG. 3 is a front view showing a second embodiment of the present invention, in which the resistance value in the third drawn configuration is further lowered. In the third drawn configuration, the distance of wiring lines drawn outward at an almost right angle to the first drawn configuration is made short, and the electrodes are bent at an angle larger than 90 degrees and are drawn to the pixel portion. By adopting such drawn configuration, the length of the drawn wiring lines in the third drawn configuration can be shortened, so that the resistance value of the transparent electrodes in the drawn portion can be lowered.

[Embodiment 3]

Figure 4:
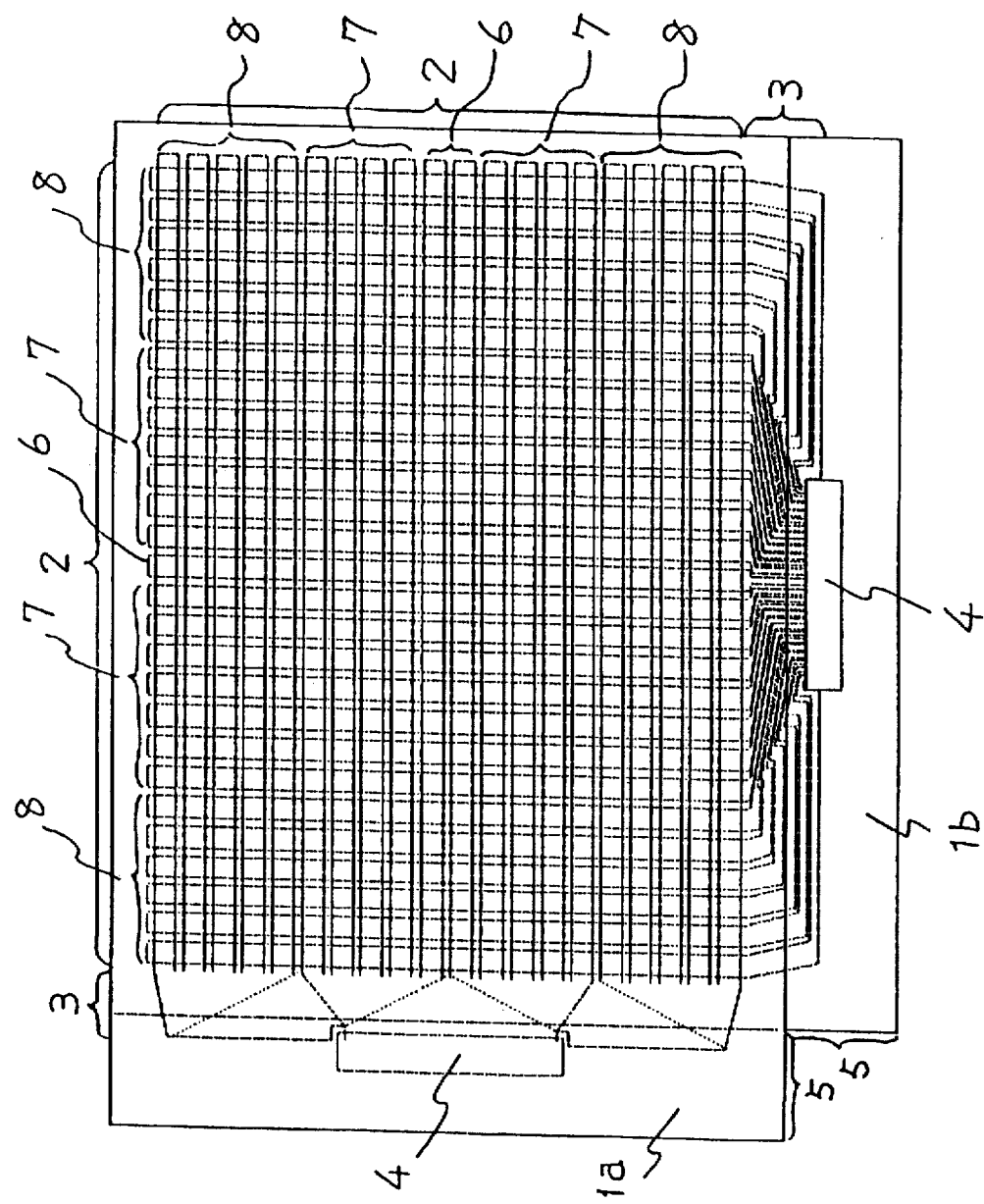
FIG. 4 is a front view showing a liquid crystal display device according to the present invention.

FIG. 4 is a front view showing a third embodiment of the present invention, in which the resistance value in the third drawn portion is further lowered. Among the wiring lines in the third drawn portion, the wiring lines, which are otherwise drawn outward at an almost right angle to the first drawn configuration, are made into such configuration as to be returned in the direction opposite to the pixel portion so that the width of the wiring lines is made thick, and are further bent at an angle larger than 90 degrees to be drawn to the pixel portion. In this embodiment, the wiring lines drawn outward could be made thick, and by thickening the wiring lines, the resistance value could be lowered. By making such configuration as to be returned in the direction opposite to the pixel portion, the wiring lines in the drawn portion become slightly long. However, the increase of resistance value due to this was small, and the total resistance value of the drawn portion could be lowered.

[Embodiment 4]

Figure 5:
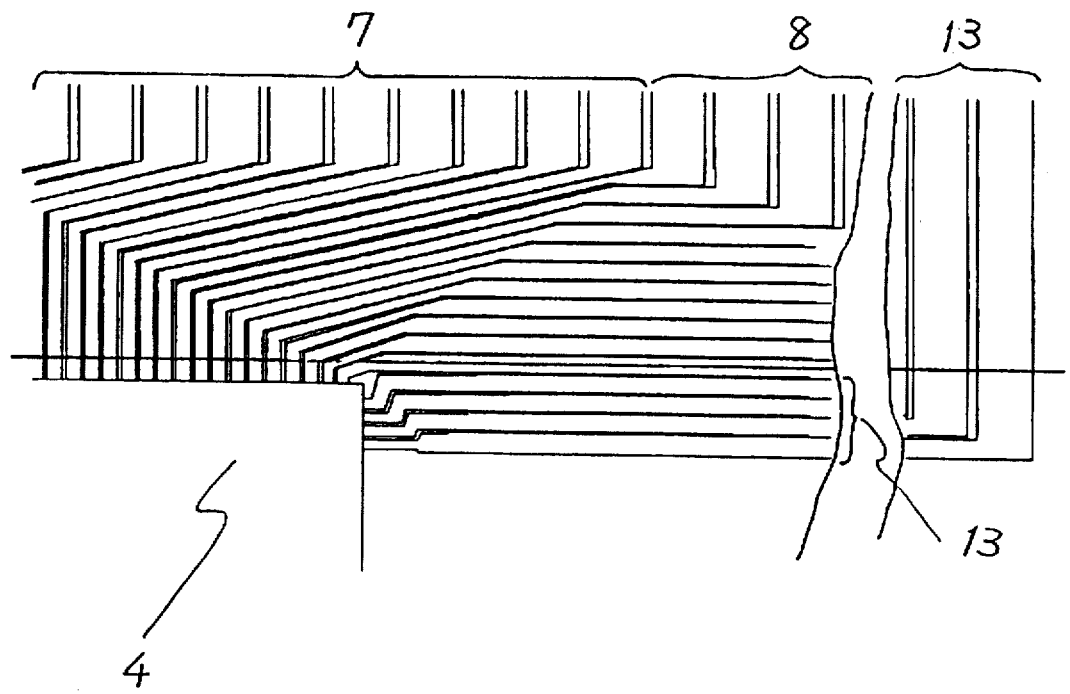
FIG. 5 is a front view showing a liquid crystal display device according to the present invention.

FIG. 5 is an enlarged view showing a liquid crystal driver IC and wiring lines in the drawn portion according to a fourth embodiment of the invention, in which the drawn configuration includes, in addition to the first, second and third drawn configurations, another drawn configuration different therefrom. Other than the first, second and third drawn configurations, the wiring lines connected to the liquid crystal driver IC 4 are formed into a fourth drawn configuration drawn partially from the side of the liquid crystal driver IC. In the fourth drawn configuration, the length and width of the wiring lines are formed so that the resistance value is not changed with respect to the third drawn configuration.

[Embodiment 5]

Figure 6:
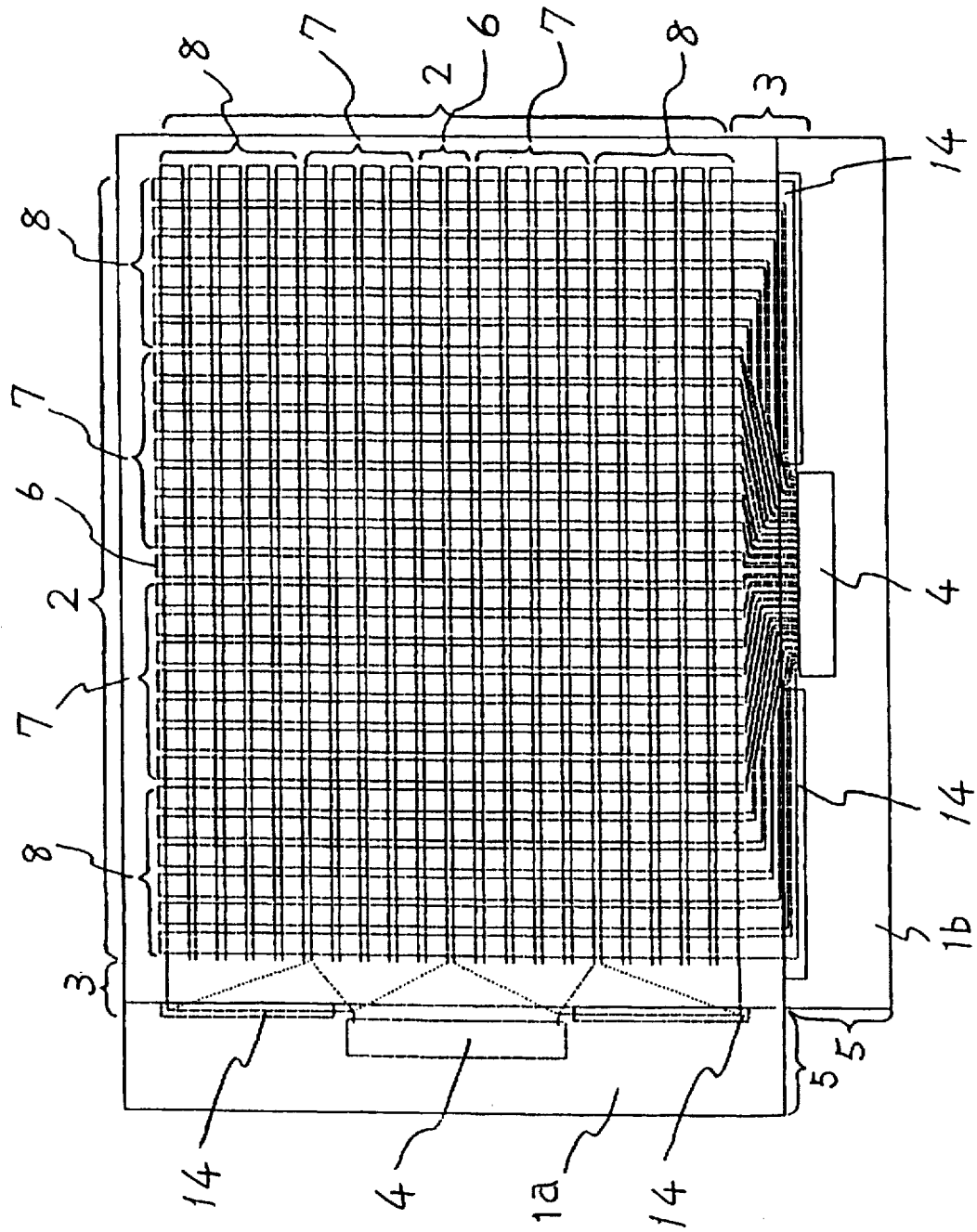
FIG. 6 is a front view showing a liquid crystal display device according to the present invention.
Figure 7:
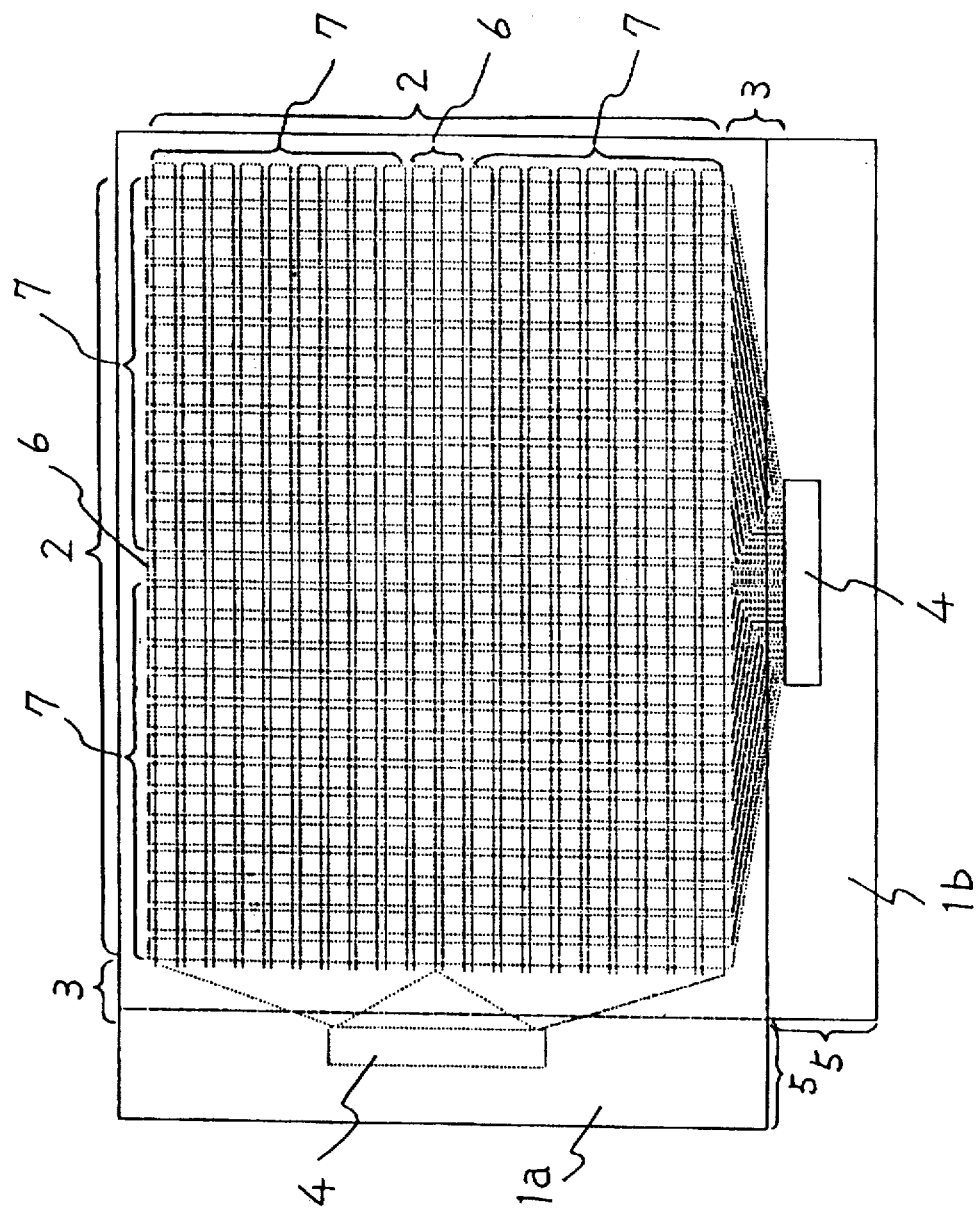
FIG. 7 is a front view showing a conventional liquid crystal display device.

FIG. 6 is a front view showing a fifth embodiment of the present invention. After fabrication of a liquid crystal cell, when the liquid crystal driver IC is mounted on the connection terminals, in some cases, electroless plating is applied to the ITO of the connection terminals so as to assure the connection. In this case, the plating is applied also to the ITO of the exposed drawn portion, so that the resistance value of the plated portion is lowered, which causes the contrast of the pixel of the plated drawn wiring line to be changed from that of other pixels. In order to prevent such, an overcoat 14 of an insulating film is provided. By providing the overcoat, even if the drawn configuration as shown in the above mentioned third embodiment is adopted, it is possible to prevent the influence of resistance value change due to the electroless plating, so that greater freedom of selection of drawn configurations can is allowed.

Although the above description relates to examples in which one liquid crystal driver is mounted at one side of the liquid crystal display device, it is needless to say that the present invention can be applied to the case in which more than two liquid crystal drivers are mounted on one side of the liquid crystal display device.

According to the present invention, by adopting the drawn configurations as described above, the picture quality of a liquid crystal display device can be improved. Further, the patterning area of fine wiring line becomes small, so that inferiority such as disconnection is decreased, and an inexpensive and high quality liquid crystal display device can be provided. The present invention can be applied to not only COG mounting but also TCP mounting, and especially, is effective to the TCP mounting in which a terminal pitch is finer than a pixel pitch.

What is claimed is:

1. A liquid crystal display device comprising two substrates, a plurality of transparent electrodes disposed on surfaces of the substrates and having electrode surfaces being opposite to one another in a matrix, a liquid crystal held between the substrates, and pixels formed of the opposite electrode surfaces in the matrix, wherein the transparent electrodes on at least one of said substrates include a connection terminal portion for connecting a circuit element, a pixel portion composed of the matrix-shaped pixels, and a drawn portion for connecting the connection terminal portion to the pixel portion, and wherein configurations of the drawn portion include a linear-shaped first drawn configuration which connects at least one center connection terminal at the center of the connection terminal portion to the pixel portion; a second drawn configuration for connecting a plurality of near center connection terminals at right and left sides of the center connection terminal to the pixel portion, the second drawn configuration being such that the transparent electrodes are linearly drawn in parallel with the first drawn configuration, are bent once in parallel with each other, and are drawn to the pixel portion; and a third drawn configuration for connecting a plurality of outer connection terminals at both sides of the near center connection terminals to the pixel portion, the third drawn configuration being such that the transparent electrodes are linearly drawn in parallel with the first drawn configuration, are bent in parallel with the second drawn configuration, are further bent at an almost right angle to the first drawn configuration and outward from the center connection terminal, and are finally bent at an almost right angle to be drawn to the pixel portion.

2. A liquid crystal display device as claimed in claim 1, wherein the circuit element connected to the connection terminals is mounted in a COG structure.

3. A liquid crystal display device as claimed in claim 1, wherein the number of liquid crystal drive signal output terminals of the circuit element connected to the connection terminals is 160 or more.

4. A liquid crystal display device as claimed in claim 1, wherein the third drawn configuration is such that a part of the third drawn configuration is drawn to go away from the pixels.

5. A liquid crystal display device as claimed in claim 1, wherein a part of the third drawn configuration is provided with an overcoat.

* * * * *